(12) United States Patent
Mori et al.

(10) Patent No.: US 8,996,182 B2
(45) Date of Patent: Mar. 31, 2015

(54) FUEL CELL SYSTEM AND POWER CONTROL METHOD THEREFOR

(75) Inventors: Hiroaki Mori, Nagoya (JP); Kenji Umayahara, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 579 days.

(21) Appl. No.: 13/376,561

(22) PCT Filed: Jun. 8, 2009

(86) PCT No.: PCT/JP2009/060423
§ 371 (c)(1),
(2), (4) Date: Dec. 6, 2011

(87) PCT Pub. No.: WO2010/143247
PCT Pub. Date: Dec. 16, 2010

(65) Prior Publication Data
US 2012/0083940 A1 Apr. 5, 2012

(51) Int. Cl.
*G05D 3/12* (2006.01)
*G05D 5/00* (2006.01)
(Continued)

(52) U.S. Cl.
CPC ....... *H01M 8/04559* (2013.01); *B60L 11/1881* (2013.01); *B60L 11/1887* (2013.01);
(Continued)

(58) Field of Classification Search
CPC ............... H01M 8/04298; H01M 8/04544; H01M 8/04604; H01M 8/04611; H01M 8/04865; H01M 8/04925; B60K 6/32; B60W 10/28
USPC .................. 429/428, 430, 432; 903/908, 944; 700/286, 295, 297–298
See application file for complete search history.

(56) References Cited

U.S. PATENT DOCUMENTS 6,960,400 B2 * 11/2005 Hara et al. .................... 429/425
8,329,351 B2 * 12/2012 Yoshida et al. ............... 429/432
(Continued)

FOREIGN PATENT DOCUMENTS

DE   102005021722   5/2006
JP   2007-209161 A   8/2007
(Continued)

OTHER PUBLICATIONS

Translation of International Preliminary Report on Patentability of PCT/JP2009/060423.
(Continued)

*Primary Examiner* — Ronald Hartman, Jr.
(74) *Attorney, Agent, or Firm* — Kenyon & Kenyon LLP

(57) ABSTRACT

There are provided a fuel cell system capable of reducing power consumption by inhibiting an unnecessary operation of a DC-DC converter, and a power control method therefor. The fuel cell system having an inverter which is connected to a load device, a first converter which is connected between a fuel cell and the inverter and sets an output voltage of the fuel cell, and a second converter which is connected between a power storage device and the inverter and sets an input voltage of the inverter includes fuel cell required output voltage calculation means for calculating a required output voltage of the fuel cell, inverter required input voltage calculation means for calculating a required input voltage of the inverter, comparison means for comparing the required output voltage of the fuel cell and the required input voltage of the inverter, and converter operation control means for causing the operation of the first converter to be suspended when judgment is made that the required output voltage of the fuel cell is not less than the required input voltage of the inverter.

5 Claims, 9 Drawing Sheets

(51) Int. Cl.
*G05D 9/00* (2006.01)
*G05D 11/00* (2006.01)
*G05D 17/00* (2006.01)
*H01M 8/04* (2006.01)
*B60L 11/18* (2006.01)
*B60L 15/20* (2006.01)

(52) U.S. Cl.
CPC ......... B60L15/2045 (2013.01); *H01M 8/0488* (2013.01); *B60L 2210/10* (2013.01); *Y02T 10/7216* (2013.01); *Y02T 10/7258* (2013.01); *Y02T 10/92* (2013.01); *Y02T 90/34* (2013.01); *Y02E 60/50* (2013.01); *Y10S 903/908* (2013.01); *Y10S 903/944* (2013.01)
USPC ........... 700/286; 700/295; 700/299; 700/300; 429/428; 429/430; 429/432; 903/908; 903/944

(56) References Cited

U.S. PATENT DOCUMENTS

| | | | |
|---|---|---|---|
| 8,343,673 B2* | 1/2013 | Yamashita | 429/428 |
| 8,481,220 B2* | 7/2013 | Hirakawa et al. | 429/430 |
| 8,603,687 B2* | 12/2013 | Hamada et al. | 429/428 |
| 2008/0096057 A1* | 4/2008 | Bono | 429/9 |
| 2010/0316922 A1* | 12/2010 | Hamada et al. | 429/432 |
| 2011/0014536 A1* | 1/2011 | Yoshida | 429/432 |

FOREIGN PATENT DOCUMENTS

| | | | | |
|---|---|---|---|---|
| JP | 2007-318938 A | | 12/2007 | |
| JP | 2008-91319 A | | 4/2008 | |
| JP | 2008-141872 A | | 6/2008 | |
| JP | 2009-165244 A | | 7/2009 | |
| WO | PCTIB2009005073 | * | 1/2009 | H01M 8/04 |
| WO | WO2009118619 | * | 1/2009 | H01M 8/04 |

OTHER PUBLICATIONS

International Search Report mailed Sep. 1, 2009 of PCT/JP2009/060423.

German Office Action mailed on Jan. 16, 2013 for German Application No. 112009004880.3.

* cited by examiner

FUEL CELL SYSTEM AND POWER CONTROL METHOD THEREFOR

This is a 371 national phase application of PCT/JP2009/060423 filed 8 Jun. 2009, the contents of which are incorporated herein by reference.

TECHNICAL FIELD

The present invention relates to a fuel cell system mounted on a vehicle, and particularly relates to a fuel cell system having two DC-DC converters.

BACKGROUND ART

As a fuel cell system mounted on a vehicle, a system having a plurality of DC-DC converters has been developed. For example, Patent Publication JP-A-2007-209161 discloses a fuel cell system having a first DC-DC converter disposed between a power storage device and an inverter and a second DC-DC converter disposed between a fuel cell and the inverter.

In the system, when a target motor output is larger than a predetermined threshold value, the first DC-DC converter is turned off, the second DC-DC converter is set into a directly connected state, and the output power of the fuel cell having high output is supplied to a motor in preference to the output power of the power storage device. On the other hand, when the target motor output is lower than the predetermined threshold value, the first DC-DC converter is operated to cause assistance power to be supplied from the power storage device, and the second DC-DC converter is put in an electrically directly connected state. With such configuration, the running performance of a vehicle has been prevented from being lowered, and effective power conversion has been allowed (Patent Literature 1).

CITATION LIST

Patent Literature

[Patent Literature 1] Patent Publication JP-A-2007-209161

SUMMARY OF INVENTION

Technical Problem

However, in the invention according to Patent Literature 1 described above, since the DC-DC converter has been switched between the first and second DC-DC converters on the basis of the output power of the motor, the output voltage of the fuel cell has become higher than the input voltage of the inverter in some cases. In such a case, although it is not necessary to increase the output voltage of the fuel cell, it follows that the DC-DC converter (the second DC-DC converter in Patent Literature 1) is unnecessarily driven. That is, the operation power of the converter is unnecessarily consumed.

In view of the foregoing, in order to solve the above-described problem, in a preferred aspect of the invention of the present application, an object thereof is to provide a fuel cell system capable of reducing power consumption by inhibiting the unnecessary operation of the DC-DC converter, and a power control method therefor.

Solution to Problem

An aspect of the fuel cell system for solving the above-described problem includes an inverter which is connected to a load device, a first converter which is connected between a fuel cell and the inverter and sets an output voltage of the fuel cell, a second converter which is connected between a power storage device and the inverter and sets an input voltage of the inverter, and a control device which controls the first converter and the second converter, and the control device causes a higher voltage of a required output voltage of the fuel cell and a required input voltage of the inverter to be outputted as the input voltage of the inverter.

According to such configuration, since the higher one of the required output voltage of the fuel cell and the required input voltage of the inverter is selected, the output voltage of the fuel cell is prevented from being higher than the input voltage of the inverter. Therefore, it is possible to inhibit an unnecessary operation of the first converter.

Specifically, the control device compares the required output voltage of the fuel cell and the required input voltage of the inverter, and causes the operation of the first converter to be suspended when judgment is made that the required output voltage of the fuel cell is not less than the required input voltage of the inverter.

That is, another aspect of the fuel cell according to the present invention is a fuel cell system having an inverter which is connected to a load device, a first converter which is connected between a fuel cell and the inverter and sets an output voltage of the fuel cell, and a second converter which is connected between a power storage device and the inverter and sets an input voltage of the inverter, the fuel cell system including: fuel cell required output voltage calculation means for calculating a required output voltage of the fuel cell; inverter required input voltage calculation means for calculating a required input voltage of the inverter; comparison means for comparing the required output voltage of the fuel cell and the required input voltage of the inverter; and converter operation control means for causing an operation of the first converter to be suspended when judgment is made that the required output voltage of the fuel cell is not less than the required input voltage of the inverter.

In addition, an aspect of the power control method for the fuel cell according to the present invention is a power control method for a fuel cell system having an inverter which is connected to a load device, a first converter which is connected between a fuel cell and the inverter and sets an output voltage of the fuel cell, and a second converter which is connected between a power storage device and the inverter and sets an input voltage of the inverter which includes the steps of calculating a required output voltage of the fuel cell, calculating a required input voltage of the inverter, comparing the required output voltage of the fuel cell and the required input voltage of the inverter, and causing an operation of the first converter to be suspended when it is judged that the required output voltage of the fuel cell is not less than the required input voltage of the inverter.

According to such configuration, when it is judged that the required output voltage of the fuel cell is not less than the required input voltage of the inverter, the operation of the first converter is inhibited, and hence it is possible to prevent an unnecessary power conversion operation.

In the present invention, if desired, it is possible to selectively add the following elements.

(1) The first converter preferably maintains the fuel cell and the inverter in an electrically connected state while the operation of the first converter is suspended. With this configuration, the required input voltage of the inverter serves as the output voltage of the fuel cell while the operation of the first converter is suspended, and hence it is possible to establish a low-efficiency operation state based on the power supply from the power storage device.

(2) When judgment is made that the required output voltage of the fuel cell is not less than a voltage obtained by adding a first margin voltage to the required input voltage of the inverter, it is preferable to suspend the operation of the first converter. According to such configuration, only after the required output voltage of the fuel cell becomes not less than the voltage obtained by adding the first margin voltage corresponding to the margin at the time of the suspension to the required input voltage of the inverter, the suspension condition of the first inverter is assumed to be satisfied. As a result, after the required output voltage of the fuel cell becomes not less than the required input voltage of the inverter, slight waiting time is spent on waiting, and hence it is possible to suspend the first converter after the input voltage of the inverter reliably becomes higher than the output voltage of the fuel cell. Therefore, it is possible to reliably suppress unnecessary power consumption.

(3) When judgment is made that the required output voltage of the fuel cell is lower than a voltage obtained by adding a second margin voltage to the required input voltage of the inverter, it is preferable to start the operation of the first converter after second waiting time elapses. According to such configuration, only after it is judged that the required output voltage of the fuel cell is lower than the voltage obtained by adding the second margin voltage corresponding to the margin at the time of the start of the operation to the required input voltage of the inverter, the operation start condition of the first inverter is assumed to be satisfied. As a result, the operation of the first inverter is started before the required output voltage of the fuel cell becomes lower than the required input voltage of the inverter, and hence it is possible to start the power conversion of the fuel cell without the delay of response. Therefore, it is possible to prevent the shortage of power supplied to the load device.

Advantageous Effects of Invention

According to the invention described above, since the unnecessary drive of the DC-DC converter is inhibited, it is possible to reduce the power consumption of the fuel cell system.

DESCRIPTION OF EMBODIMENTS

Figure 1:
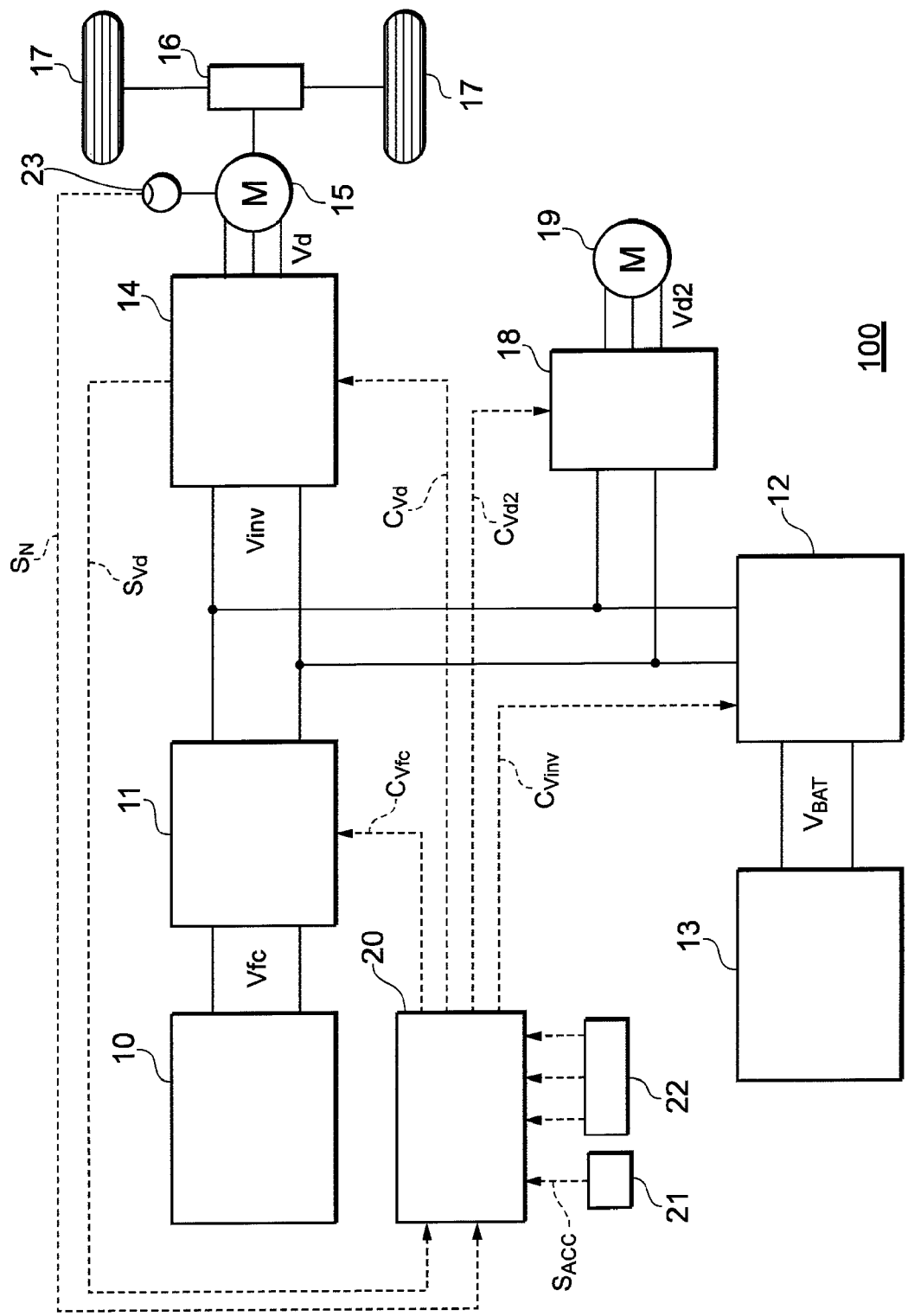
FIG. 1 is a system configuration view of an FCHV system according to an embodiment.

Next, a description will be given of preferred embodiments for carrying out the present invention with reference to the drawings.

In the following description of the drawings, the same or similar portions are designated by the same or similar reference numerals. Note that the drawings are schematic. Consequently, specific characteristics and the like should be determined by checking the following description. In addition, it will be easily understood that, among the individual drawings, portions having mutually different characteristics are included. Further, although each of the following embodiments describes that one control device executes all processing, the embodiment includes the case where a plurality of control units cooperate to complete the control processing according to the present invention.

(First Embodiment)

The present first embodiment relates to an aspect of the invention as a basic aspect of the present invention in which, the higher voltage of a required output voltage of a fuel cell and a required input voltage of an inverter is outputted as an input voltage of the inverter. In particular, the present first embodiment relates to a power control method in which the required output voltage of the fuel cell and the required input voltage of the inverter are compared with each other and, when it is judged that the required output voltage of the fuel cell is not less than the required input voltage of the inverter, the operation of a first converter is suspended.

(System Configuration)

FIG. 1 is a block diagram of a fuel cell system 100 mounted on a vehicle according to the present first embodiment. Such vehicle is an FCHV (Fuel Cell Hybrid Vehicle).

The fuel cell system 100 includes a fuel cell 10, a first converter 11, a second converter 12, a battery 13, an inverter 14, a motor 15, an auxiliary equipment inverter 18, a high-voltage auxiliary equipment 19, and a control device 20.

The fuel cell 10 is power generation means formed by stacking a plurality of unit cells in series. The unit cell has a structure in which an MEA (Membrane Electrode Assembly) obtained by sandwiching an ion exchange membrane such as a polymer electrolyte or the like between an anode electrode and a cathode electrode is sandwiched between separators. In the anode electrode, an anode-electrode catalyst layer is provided on a porous support layer, while in the cathode electrode, a cathode-electrode catalyst layer is provided on a porous support layer. To the anode electrode of each unit cell, a fuel gas (e.g., a hydrogen gas) is supplied via the separator from a fuel gas supply system which is not shown. To the cathode electrode of each unit cell, an oxidized gas (e.g., air) is supplied via the separator from an oxidized gas supply system which is not shown. The separator is formed with a passage for a coolant, and the coolant is supplied to the passage from a coolant supply system which is not shown. In the fuel cell 10, an oxidation reaction of Expression (1) occurs in the anode electrode, a reduction reaction of Expression (2) occurs in the cathode electrode, and an electromotive reaction of Expression (3) occurs in the entire fuel cell 10.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

By connecting a plurality of unit cells in series, the fuel cell 10 outputs an output terminal voltage Vfc to an output terminal. The fuel cell 10 has a predetermined current-voltage output characteristic, and an output current and an output power are changed correspondingly to change in the output terminal voltage Vfc.

The first converter 11 is a voltage converter, and has a configuration as a DC-DC converter. When a three-phase operation system is employed, the first converter 11 has a circuit configuration of, e.g., a three-phase bridge converter or the like. The three-phase bridge converter has switching elements including a reactor, a rectification diode, and an IGBT (Insulated Gate Bipolar ransistor). By combining these elements, there are formed a circuit part similar to an inverter in which an inputted DC voltage is temporarily converted to alternating current, and a part in which the alternating current is rectified again to be converted to a different DC voltage. Note that the circuit configuration of the first converter 11 is not limited to the above-described configuration, and any configuration capable of controlling the output terminal voltage Vfc of the fuel cell 10 can be adopted.

The first converter 11 has the output terminal of the fuel cell 10 connected on the primary side, and the input terminal of the inverter 14 connected on the secondary side. The first converter 11 is configured to control the terminal voltage on the primary side (the output terminal voltage Vfc of the fuel cell 10) according to a command $C_{Vfc}$ for driving from the control device 20. That is, by the first converter 11, the output terminal voltage Vfc of the fuel cell 10 is controlled to become a voltage in correspondence to a target output (i.e., the target output terminal voltage Vfc). In addition, the first converter 11 is configured to convert the voltage such that the output terminal voltage Vfc of the fuel cell 10 and an input terminal voltage Vinv of the inverter 14 match each other. Further, when receiving a command $C_{Vfc}$ for suspending the operation from the control device 20, the first converter 11 is configured to bring a part of the internal switching elements into an ON state so that the primary side and the secondary side are electrically directly connected.

The battery 13 is a power storage device, and functions as a storage source for surplus power of power generated in the fuel cell 10, a storage source for regenerative energy in regenerative braking, and an energy buffer at the time of load change involved in acceleration or deceleration of a fuel cell vehicle. As the battery 13, for example, there are used secondary batteries such as a nickel-cadmium battery, a nickel-hydrogen battery, or a lithium secondary battery. An output terminal voltage $V_{BAT}$ of the battery 13 serves as the input terminal voltage of the second converter 12.

The second converter 12 is a voltage converter, and has the configuration as the DC-DC converter similar to that of the first converter 11. The second converter 12 has the output terminal of the battery 13 connected on the primary side, and has the input terminal of the inverter 14 connected on the secondary side. The second converter 12 is configured to control the terminal voltage on the secondary side (the input terminal voltage Vinv of the inverter 14) according to a command from the control device 20. For example, when the requested power of the motor 15 is changed, the second converter 12 changes the input terminal voltage Vinv of the inverter 14 until the input terminal voltage Vinv reaches the set target input voltage. The second converter 12 is configured such that stepwise control is performed in which, after the input terminal voltage Vinv of the inverter 14 reaches the target input voltage, the first converter 11 controls the output terminal voltage Vfc of the fuel cell 10. Note that, as the circuit configuration of the second converter 12, any configuration capable of controlling the input terminal voltage Vinv of the inverter 14 can be adopted.

The inverter 14 is a power converter, and is configured to convert direct current supplied to the input terminal to alternating current and supply the alternating current to the motor 15. The circuit configuration of the inverter 14 has, e.g., a PWM inverter circuit driven by a pulse width modulation method. The inverter 14 is configured to supply three-phase AC power having a predetermined drive voltage Vd (r.m.s. value) to the motor 15 according to a command $C_{vd}$ for specifying an inverter requested voltage from the control device 20. In addition, the inverter 14 is configured to output the currently outputted drive voltage (the inverter output voltage) Vd to the control device 20 as a drive voltage signal $S_{Vd}$.

The motor 15 is a traction motor for running of a vehicle, and is configured to give thrust to the present vehicle when drive power is supplied thereto, and generate regenerative power when the vehicle is decelerated. A differential 16 is a deceleration device, and is configured to reduce high-speed revolution of the motor 15 at a predetermined ratio, and cause a shaft provided with tires 17 to rotate. An RPM sensor 23 is configured to detect the RPM of the motor 15 to output an RPM signal $S_N$ to the control device 20.

The auxiliary equipment inverter 18 is a power converter, and is configured to convert direct current supplied to the input terminal to alternating current and supply the alternating current to the high-voltage auxiliary equipment 19. The circuit configuration of the auxiliary equipment inverter 18 is the same as that of the inverter 14 described above. The auxiliary equipment inverter 18 is configured to supply three-phase AC power having a predetermined drive voltage Vd2 (r.m.s. value) to the high-voltage auxiliary equipment 19 according to a command $C_{Vd2}$ from the control device 20. Note that the high-voltage auxiliary equipment 19 is a generic name for a humidifier, an air compressor, a hydrogen pump, and a coolant pump for causing the present fuel cell system 100 to function which are not shown.

The control device 20 is a computer system for controlling the fuel cell system 100, and has, e.g. a CPU, a RAM, and a ROM. The control device 20 inputs an accelerator opening signal $S_{ACC}$ in correspondence to an accelerator opening Acc from an accelerator opening sensor 21. In addition, the control device 20 inputs various signals from a sensor group 22, and performs various calculations required for the control. The sensor group 22 includes a current sensor for detecting the output current of the fuel cell 10, a voltage sensor for detecting the output terminal voltage Vfc, a temperature sensor for detecting the coolant temperature of the fuel cell 10, and an RPM sensor for detecting the RPM of the air compressor, the hydrogen pump, or the coolant pump. In addition, the control device 20 inputs the RPM signal $S_N$ from the RPM sensor 2113 for detecting the RPM N of the motor 15.

The control device 20 refers to these signals to control the entire system.

A description will be given of the outline of the control device 20. The control device 20 calculates a motor requested torque $T_{REQ}$ on the basis of the accelerator opening Acc and the motor RPM N. Then, the control device 20 calculates a motor requested power $P_M$ on the basis of the motor requested torque $T_{REQ}$ and the motor RPM N. Subsequently, the control device 20 calculates a power generation requested power $P_{REQ}$ on the basis of the motor requested power $P_M$ and the like. Then, the control device 20 calculates a requested output voltage $Vfc_{REQ}$ as the output terminal voltage Vfc of the fuel cell 10 required to output the power generation requested power $P_{FC}$ from a current-voltage (I-V) characteristic of the fuel cell 10. On an as needed basis, the control device 20 determines the allocation of the output power for the fuel cell 10 and for the battery 13. Subsequently, the control device 20 outputs the command $C_{Vfc}$ for controlling the output terminal voltage Vfc of the fuel cell 10 such that the determined requested output voltage $Vfc_{REQ}$ is obtained. In addition, the control device 20 outputs the command $C_{Vinv}$ to the second converter 12 to control the input terminal voltage Vinv of the inverter 14 such that the determined requested voltage of the battery 13 is extracted. Further, the control device 20 outputs the command $C_{Vd}$ to the inverter 14 to cause the inverter 14 to output the desired drive voltage Vd to control the torque of the motor 15 such that the motor requested torque $T_{REQ}$ is obtained.

In particular, the present first embodiment is characterized in that the control device 20 outputs the command $C_{Vd}$ by which the higher voltage of the required output voltage $Vfc_{REQ}$ of the fuel cell 10 and a required input voltage $Vinv_{REQ}$ of the inverter 14 is outputted as the input terminal voltage Vinv of the inverter 14.

(Functional Block)

Figure 2:
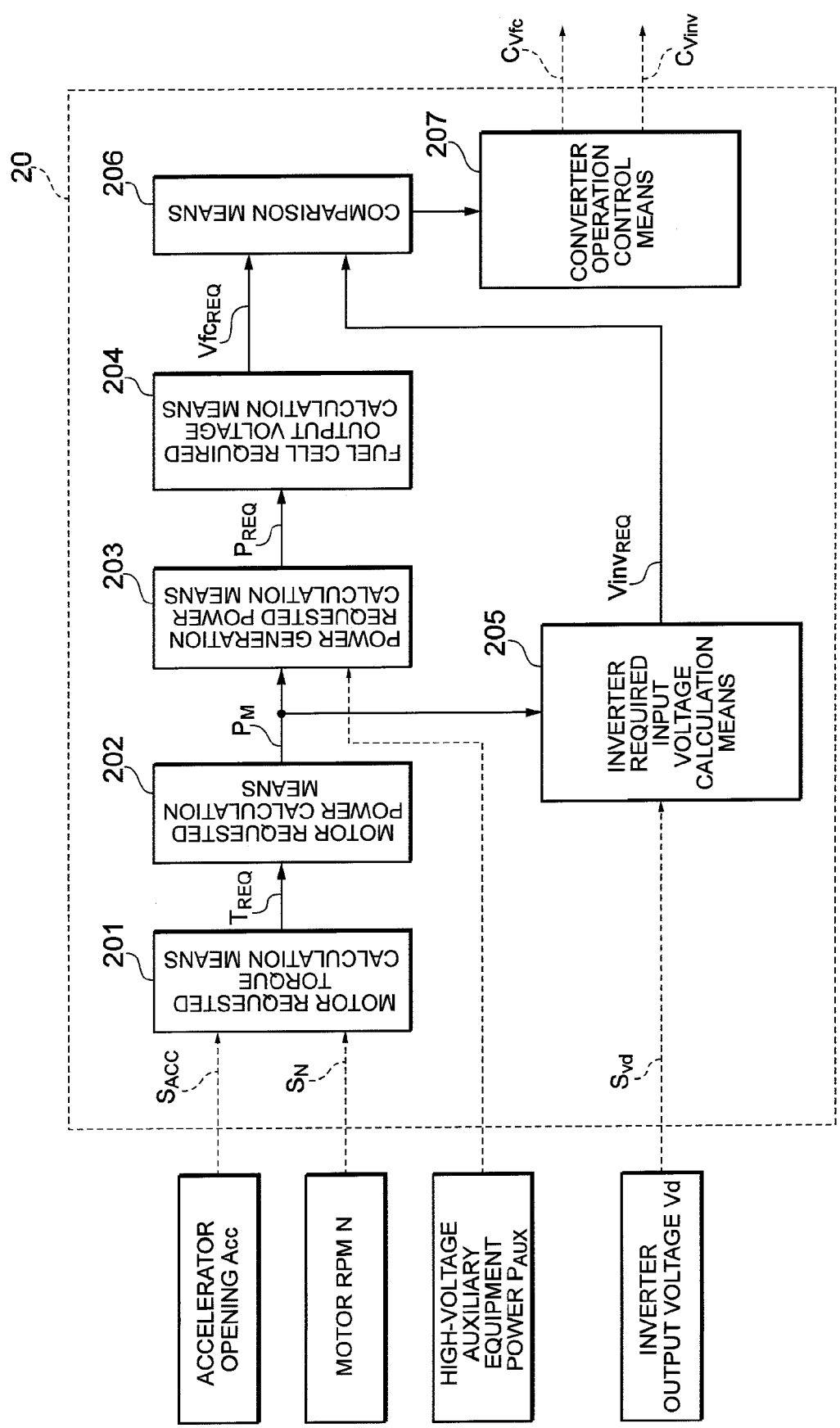
FIG. 2 is a diagram of functional blocks for executing power control of a fuel cell system according to the present embodiment.

FIG. 2 shows a diagram of functional blocks for implementing power control of the fuel cell system 100 which are functionally implemented by the control device 20 of the present first embodiment. The control device 20 periodically or non-periodically calls a program for executing control processing according to the present invention (see FIG. 8), and these functional blocks are thereby functionally implemented.

Note that the functional blocks shown in FIG. 2 have the configuration in which functions are classified for the sake of convenience, and the functions are not necessarily required to be separated as shown in FIG. 2. As long as the configuration is capable of controlling the input terminal voltage Vinv of the inerter 14 on the basis of inputs listed in FIG. 2, the same functions may be implemented by using functional blocks different from those in FIG. 2.

As shown in FIG. 2, the control device 20 includes, as the functional blocks, motor requested torque calculation means 201, motor requested power calculation means 202, power generation requested power calculation means 203, fuel cell required output voltage calculation means 204, inverter required input voltage calculation means 205, comparison means 206, and converter operation control means 207.

The motor requested torque calculation means 201 calculates the output requested torque on the basis of the accelerator opening Acc acquired from the accelerator opening signal $S_{ACC}$ and the RPM N of the motor 15 acquired from the RPM signal $S_N$ to determine the requested torque $T_{REQ}$ of the motor 15. As a typical characteristic of the motor, when the RPM N of the motor and the accelerator opening Acc are determined, a generable torque is determined correspondingly to the RPM (hereinafter the characteristic is referred to as an "N-T characteristic"). The motor requested torque calculation means 201 refers to such N-T characteristic on the basis of the accelerator opening Acc, and calculates the motor requested torque $T_{REQ}$.

The motor requested power calculation means 202 is a functional block which calculates the motor requested power on the basis of the motor requested torque $T_{REQ}$. The motor requested power $P_M$ corresponds to a value obtained by multiplying the motor requested torque $T_{REQ}$ by the RPM N ($P_M = N \times T_{REQ}$).

The power generation requested power calculation means 203 is a functional block which calculates the power generation requested power $P_{REQ}$ of the fuel cell on the basis of the motor requested power $P_M$. The power generation requested power $P_{REQ}$ is calculated by adding the requested power of a load device other than the motor to the calculated motor requested power $P_M$. For example, a value obtained by adding high-voltage auxiliary equipment power $P_{AUX}$ required in the high-voltage auxiliary equipment 19 to the motor requested power $P_M$ is calculated as the power generation requested power $P_{REQ}$.

The fuel cell required output voltage calculation means 204 calculates the required output voltage $Vfc_{REQ}$ of the fuel cell 10 on the basis of the determined power generation requested power $P_{REQ}$.

Figure 3:
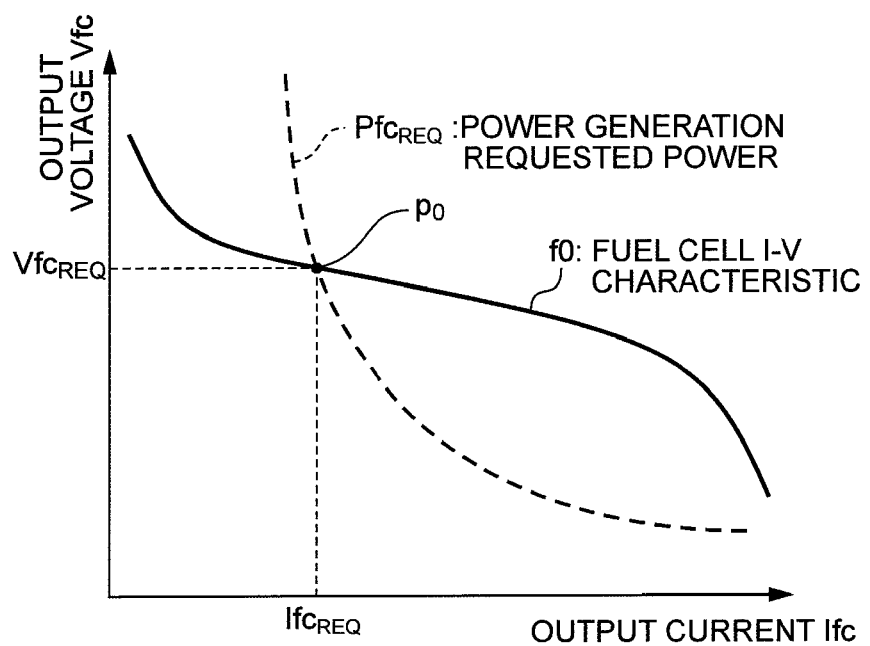
FIG. 3 is a characteristic view showing a current-voltage (I-V) characteristic f0 and a power curve indicating a fuel cell requested power $P_{REQ}$ of a fuel cell.

FIG. 3 shows an output current-output voltage (I-V) characteristic f0 and a power curve indicating the fuel cell requested power $P_{REQ}$ of the fuel cell 10. During the normal operation, the fuel cell 10 changes the output current and the output voltage according to the fuel cell I-V characteristic as shown in FIG. 3. The fuel cell requested power $P_{REQ}$ determined by the above calculation exhibits a hyperbolic isoelectric power line indicated by a broken line in FIG. 3. An intersection point of the fuel cell I-V characteristic f0 and the fuel cell requested power $P_{REQ}$ serves as an operation point p0 of the present fuel cell system 100.

The fuel cell required output voltage calculation means 204 pre-stores the fuel cell I-V characteristic f0 of FIG. 3 and, when the power generation requested power $P_{REQ}$ is determined, refers to the stored fuel cell I-V characteristic f0 to calculate the intersection point with the determined fuel cell requested power $P_{REQ}$. This intersection point is the operation point p0 which determines the requested output voltage $Vfc_{REQ}$ and a requested output current $Ifc_{REQ}$ of the fuel cell 10. Note that it is also possible to refer to a fuel cell P-V characteristic f1 described later in FIG. 4 to determine the requested output voltage $Vfc_{REQ}$ of the fuel cell 10 as the fuel cell output voltage in correspondence to the fuel cell requested power $P_{REQ}$.

The inverter required input voltage calculation means 205 is a functional block which calculates the required input voltage $Vinv_{REQ}$ for the inverter 14. The required input voltage $Vinv_{REQ}$ of the inverter 14 is determined as the input terminal voltage Vinv of the inverter 14 required to cause the inverter 14 to output the determined motor requested power $P_M$.

Figure 4:
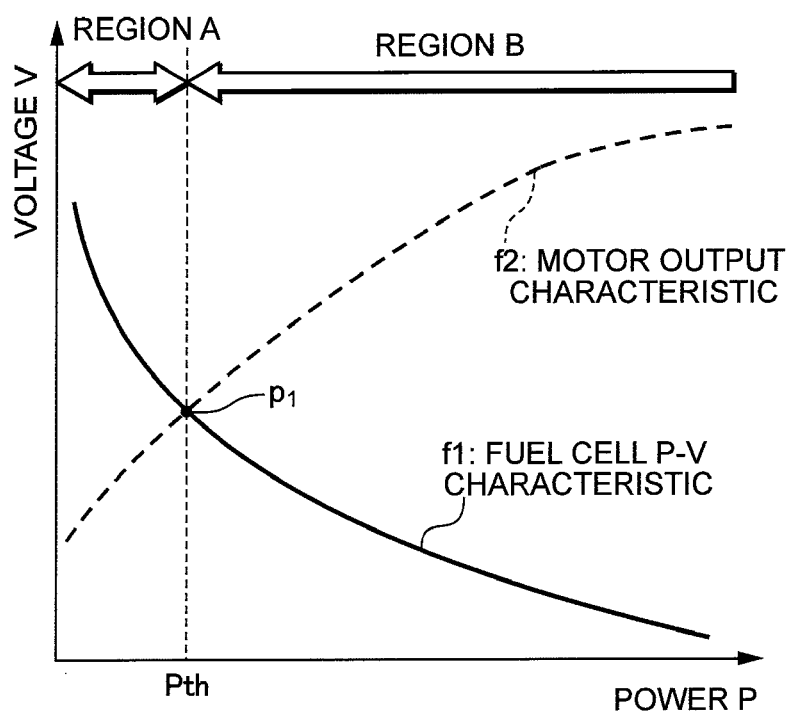
FIG. 4 is a characteristic view showing a generated power (Pfc)-output terminal voltage (Vfc) characteristic f1 in the fuel cell and a drive power (PM)-input terminal voltage (Vinv) characteristic f2 in a motor.

FIG. 4 shows a generated power (Pfc)-output terminal voltage (Vfc) characteristic (fuel cell P-V characteristic) f1 in the fuel cell 10, and a drive power ($P_M$) of the motor 15-input terminal voltage (Vinv) of the inverter 14 characteristic (motor output characteristic) f2. As shown in the fuel cell P-V characteristic f1 in FIG. 4, in the fuel cell 10, as the output terminal voltage Vfc decreases, the generated power increases. In addition, as shown in the motor output characteristic f2 in FIG. 4, as the drive power of the motor 15 increases, the input terminal voltage Vinv to the inverter 14 increases. In the motor output characteristic f2 of FIG. 4, the drive power of the motor 15 corresponds to the motor requested power $P_M$ determined by the above calculation. The input terminal voltage Vinv of the inverter 14 corresponds to the requested input voltage $Vinv_{REQ}$ of the inverter 14 determined by the above calculation.

The inverter required input voltage calculation means 205 pre-stores the drive power ($P_M$) of the motor 15-input terminal voltage (Vinv) of the inverter 14 characteristic as shown in the motor output characteristic f2 of FIG. 4. On the basis of the determined motor requested power $P_M$, the inverter required input voltage calculation means 205 refers to the stored motor output characteristic f2 to calculate the requested input voltage $Vinv_{REQ}$ of the inverter 14.

The comparison means 206 is a functional block which compares the determined required output voltage $Vfc_{REQ}$ of the fuel cell 10 and the determined requested input voltage $Vinv_{REQ}$ of the inverter 14.

In order to drive the motor 15 with the power as requested (the motor requested power $P_M$), the input terminal voltage Vinv determined by the motor output characteristic f2 of FIG. 4 needs to be inputted to the inverter 14 as the minimum voltage. Herein, in FIG. 4, the fuel cell P-V characteristic f1 and the motor output characteristic f2 intersect at an intersection point p1 in correspondence to a power threshold value Pth. In a region B having the power higher than the power threshold value Pth, when the fuel cell 10 supplies power required for the motor 15, the output terminal voltage Vfc of the fuel cell 10 is lower than the input terminal voltage Vinv of the inverter 14. As a result, up to the level of the required input terminal voltage Vinv of the inverter 14, the output terminal voltage Vfc of the fuel cell 10 should be increased. A device for performing this increase processing is the first converter 11.

On the other hand, in a region A having the power not more than the power threshold value Pth shown in FIG. 4, the output terminal voltage Vfc of the fuel cell 10 is higher than the input terminal voltage Vinv of the inverter 14 required to drive the motor 15. Therefore, in the operation in the region A, there is no necessity for further increasing the output terminal voltage Vfc of the fuel cell 10. This is the case where the output terminal voltage Vfc of the fuel cell 10 may be supplied as the input terminal voltage Vinv of the inverter 14.

The comparison means 206 compares the required output voltage $Vfc_{REQ}$ of the fuel cell 10 and the required input voltage $Vinv_{REQ}$ of the inverter 14. This comparison is equal to the detection of the operation on the side of the region A or on the side of the region B in the comparison with the power threshold value Pth of FIG. 4. The judgment is performed by the converter operation control means 207.

The converter operation control means 207 is a functional block which causes the operation of the first converter 11 to be suspended when it is judged that the required output voltage $Vfc_{REQ}$ of the fuel cell 10 is not less than the required input voltage $Vinv_{REQ}$ of the inverter 14. Specifically, in accordance with the above judgment, the converter operation control means 207 outputs the command $C_{Vfc}$ for suspending or continuing the operation to the first converter 11. When receiving the command $C_{Vfc}$ for suspending the operation, the first converter 11 suspends the voltage conversion operation and maintains the primary side and the secondary side of the first converter 11 in an electrically directly connected state, i.e., a conduction state. With this, the output terminal voltage Vfc of the fuel cell 10 becomes equal to the input terminal voltage Vinv of the inverter 14. By the above processing, to the inverter 14, the higher voltage of the required output voltage $Vfc_{REQ}$ of the fuel cell 10 and the required input voltage $Vinv_{REQ}$ of the inverter 14 is outputted.

Figure 5:
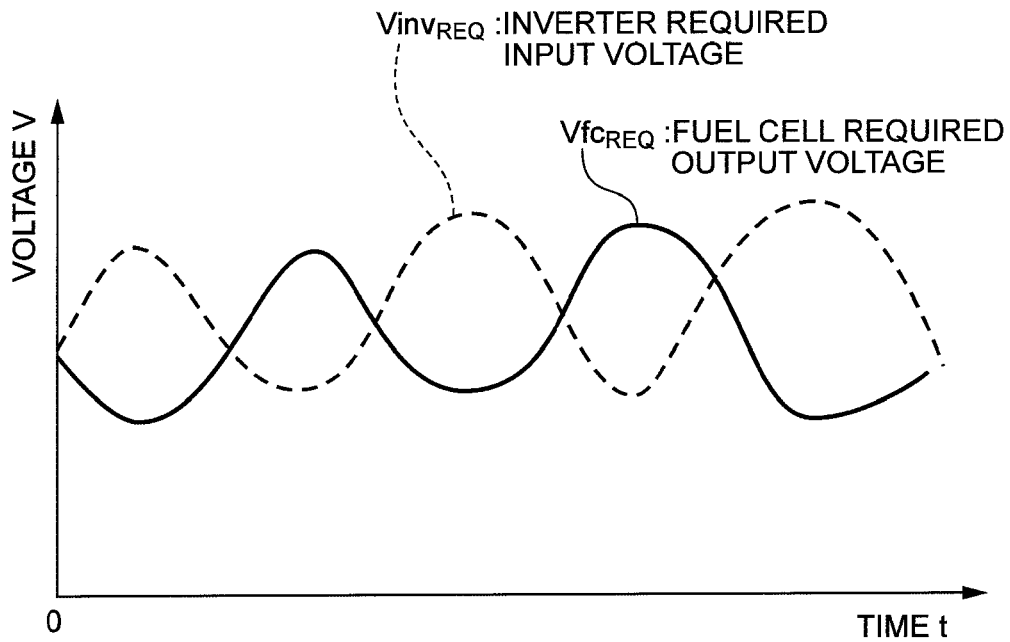
FIG. 5 is an example of change over time of each of a fuel cell required output voltage $Vfc_{REQ}$ and an inverter required input voltage $Vinv_{REQ}$.

FIG. 5 shows an example of change over time of each of the required output voltage $Vfc_{REQ}$ of the fuel cell 10 and the required input voltage $Vinv_{REQ}$ of the inverter 14. In the fuel cell vehicle, load conditions momentarily change with change of the accelerator opening or the like. When the load conditions change, the motor requested power $P_M$ fluctuates. Every time the motor requested power $P_M$ fluctuates, as described in FIG. 4, the operation point moves back and forth between the region A and the region B. During the movement of the operation point in the region A, the required output voltage $Vfc_{REQ}$ of the fuel cell 10 is higher than the required input voltage $Vinv_{REQ}$ of the inverter 14. On the other hand, during the movement of the operation point in the region B, the required input voltage $Vinv_{REQ}$ of the inerter 14 is higher than the required output voltage $Vfc_{REQ}$ of the fuel cell 10. In FIG. 5, such change of each of the required output voltage $Vfc_{REQ}$ and the required input voltage $Vinv_{REQ}$ of the inverter 14 is plotted using a time axis.

Figure 6:
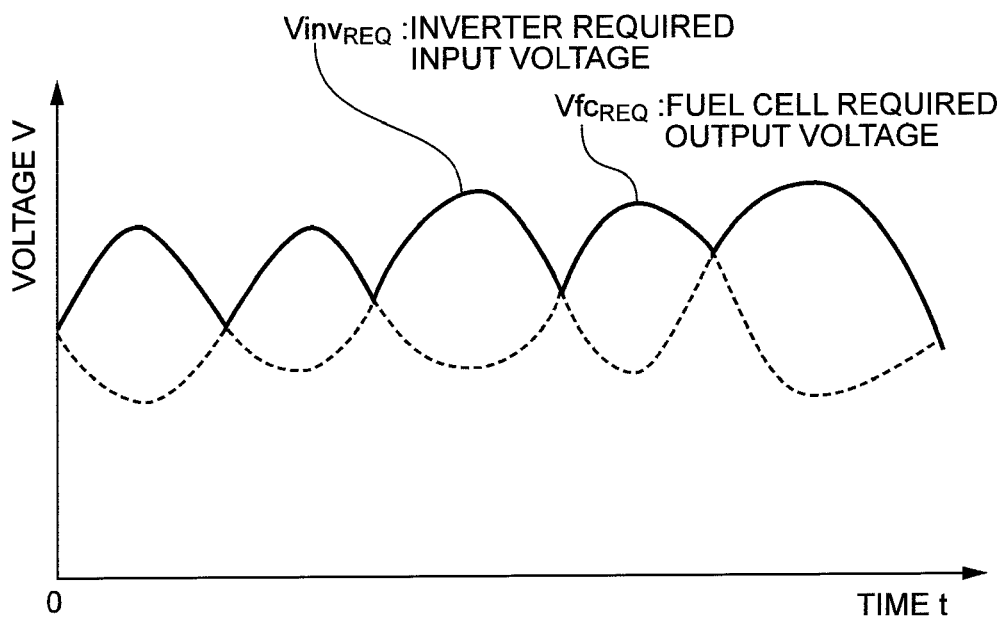
FIG. 6 is an example of change over time of an inverter input unit voltage Vinv when the present invention is applied in the characteristics of FIG. 4.
Figure 7:
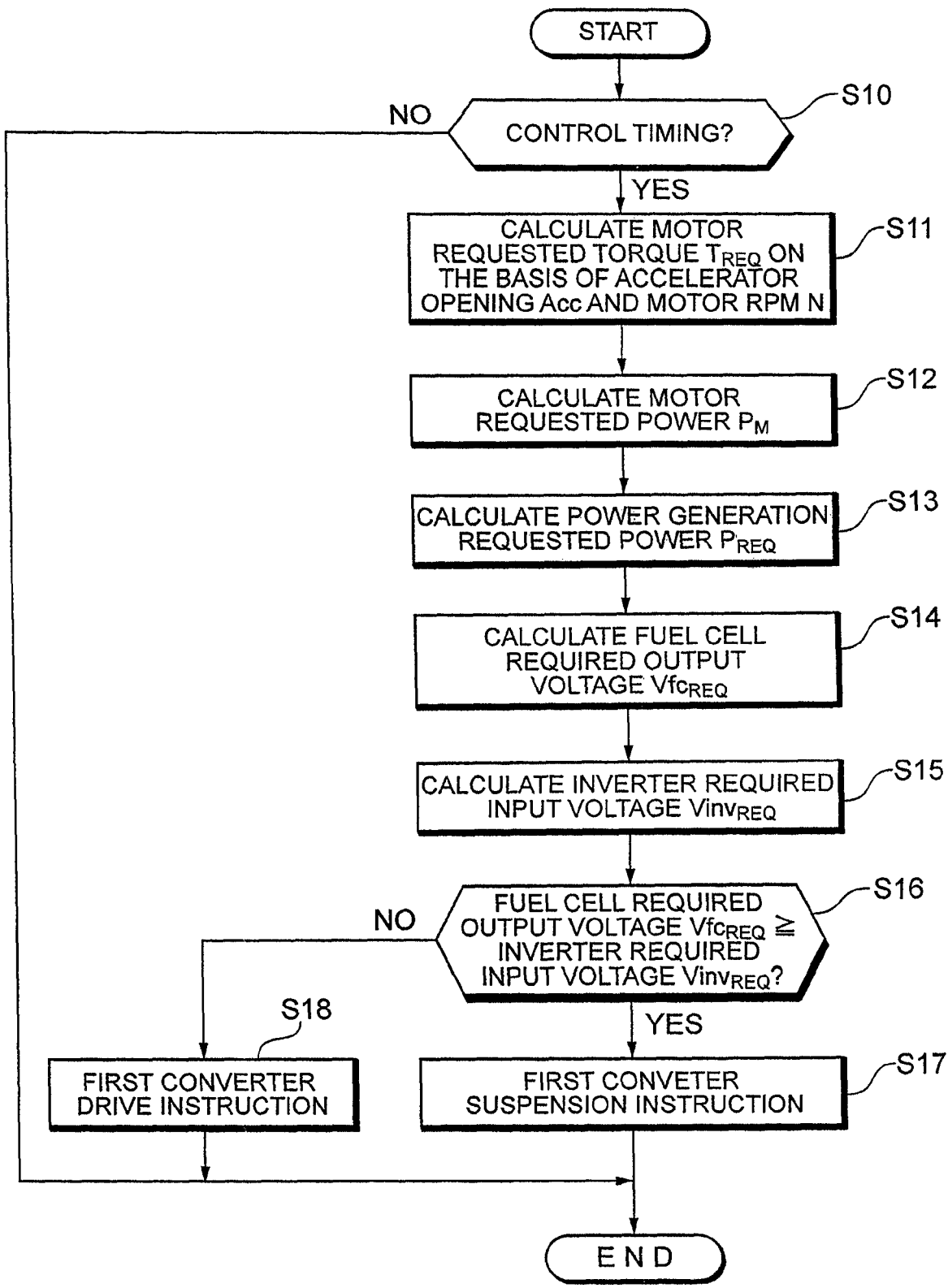
FIG. 7 is a power control flowchart of the fuel cell system according to a present first embodiment.

FIG. 6 shows change of the input terminal voltage Vinv supplied to the inverter 14 when the required output voltage $Vfc_{REQ}$ of the fuel cell 10 and the required input voltage $Vinv_{REQ}$ of the inverter 14 change as in the example of FIG. 5 in the fuel cell system 100 according to the present first embodiment. In the present fuel cell system 100, by the actions of the above comparison means 206 and converter operation control means 207, the higher voltage of the required output voltage $Vfc_{REQ}$ of the fuel cell 10 and the required input voltage $Vinv_{REQ}$ of the inverter 14 is outputted as the input terminal voltage Vinv of the inverter 14.

Therefore, as shown in FIG. 6, when the required input voltage $Vinv_{REQ}$ of the inverter 14 is higher than the required output voltage $Vfc_{REQ}$ of the fuel cell 10, it is judged that the operation point is in the region B of FIG. 4. Consequently, the required input voltage $Vinv_{REQ}$ outputted by the second converter 12 is inputted to the inverter 14. On the other hand, when the required output voltage $Vfc_{REQ}$ of the fuel cell 10 is higher than the required input voltage $Vinv_{REQ}$ of the inverter 14, it is judged that the operation point is in the region A of FIG. 4. Consequently, the operation of the first converter 11 is suspended and the directly connected state is established so that the output terminal voltage Vfc of the fuel cell 10 (i.e., the fuel cell required output voltage $Vfc_{REQ}$) is directly supplied to the inverter 14 via the first converter 11.

Note that, when the operation point is in the region A, although the second converter 12 may increase the output terminal voltage $V_{SAT}$ of the battery 13 up to the level of the fuel cell required output voltage $Vfc_{REQ}$, the second converter 12 may also be brought into a disconnected state. When the second converter 12 is brought into the disconnected state, by the control in which all of the switching elements are turned off in the second converter 12 or the like, the primary side and the secondary side of the second converter 12 are electrically isolated. By establishing the disconnected state, it is possible to suppress power consumption resulting from the operation of the second converter 12.

(Operation)

Next, with reference to the flowchart of FIG. 6, a description will be given of the power control processing of the fuel cell system 100 of the present first embodiment implemented by the functional blocks described above. The following control processing is periodically or non-periodically executed repeatedly. For example, in the present embodiment, it is assumed that, at every predetermined control period, a software program for executing the control processing as shown in FIG. 6 is called.

In Step S10, the control device 20 judges whether or not it is control timing coming at every control period. As the result of the judgment, when it is the control timing (YES), the power control processing moves to Step S11 where the motor requested torque calculation means 201 shown in FIG. 2 reads the accelerator opening signal $S_{ACC}$ from the accelerator opening sensor 21 and reads the RPM signal $S_N$ from the RPM sensor 23. Subsequently, the motor requested torque calculation means 201 calculates the output requested torque on the basis of the accelerator opening Acc indicated by the accelerator opening signal $S_{ACC}$ and the motor RPM N indicated by the RPM signal $S_N$, and further calculates the motor requested torque $T_{REQ}$. That is, the motor requested torque calculation means 201 refers to a data table or a relational expression showing a predetermined N-T characteristic to determine an RPM N-motor requested torque characteristic $T_{REQ}$ in correspondence to the accelerator opening Acc, and calculates the motor requested torque $T_{REQ}$ in correspondence to the motor RPM N from the N-T characteristic.

Subsequently, the power control processing moves to Step S12 where the motor requested power calculation means 202 shown in FIG. 2 calculates the motor requested power $P_M$ on the basis of the motor requested torque $T_{REQ}$. Specifically, the value obtained by multiplying the motor requested torque $T_{REQ}$ by the RPM N is calculated as the motor requested power $P_M (=N \times T_{REQ})$.

Next, the power control processing moves to Step S13 where the power generation requested power calculation means 203 shown in FIG. 2 calculates the value obtained by adding the calculated motor requested power $P_M$ to the high-voltage auxiliary equipment power $P_{AUX}$ required in the high-voltage auxiliary equipment 19 as the power generation requested power $P_{REQ}$.

Then, the power control processing moves to Step S14 where the fuel cell required output voltage calculation means 204 shown in FIG. 2 refers to the fuel cell I-V characteristic f0 as shown in FIG. 3. Subsequently, the fuel cell required output voltage calculation means 204 determines the intersection point of the determined fuel cell requested power $P_{REQ}$ and the fuel cell I-V characteristic f0 to calculate the requested output voltage $Vfc_{REQ}$ of the fuel cell 10.

Next, the power control processing moves to Step S15 where the inverter required input voltage calculation means 205 shown in FIG. 2 refers to the motor output characteristic f2 as shown in FIG. 4 to calculate the requested input voltage $Vinv_{REQ}$ of the inverter 14 on the basis of the determined motor requested power $P_M$.

Subsequently, in Step S16, the comparison means 206 shown in FIG. 2 compares the determined required output voltage $Vfc_{REQ}$ of the fuel cell 10 and the determined required input voltage $Vinv_{REQ}$ of the inverter 14. As the result, when it is judged that the required output voltage $Vfc_{REQ}$ of the fuel cell 10 is not less than the required input voltage $Vinv_{REQ}$ of the inverter 14 (YES), the power control processing moves to Step S17. Then, the converter operation control means 207 shown in FIG. 2 outputs the command $C_{Vfc}$ for suspending the operation of the first converter 11 to the first converter 11. The first converter 11 having received the command $C_{Vfc}$ for suspending the operation suspends the voltage conversion operation and electrically directly connects the primary side and the secondary side. By this operation, the output terminal voltage Vfc of the fuel cell 10 is supplied as the input terminal voltage Vinv of the inverter 14.

On the other hand, in Step S16, when it is judged that the required output voltage $Vfc_{REQ}$ of the fuel cell 10 is lower than the required input voltage $Vinv_{REQ}$ of the inverter 14 (NO), the power control processing moves to Step S18. The converter operation control means 207 outputs the command $C_{Vfc}$ for continuing the operation of the first converter 11 to the first converter 11. Upon reception of the command, the first converter 11 continues the operation for increasing the output terminal voltage Vfc of the fuel cell 10 up to the level of the input terminal voltage Vinv supplied to the inverter 14 by the second converter 12.

Note that, when it is judged that it is not the control timing in Step S10 (NO), the control processing is ended without being executed.

Figure 8:
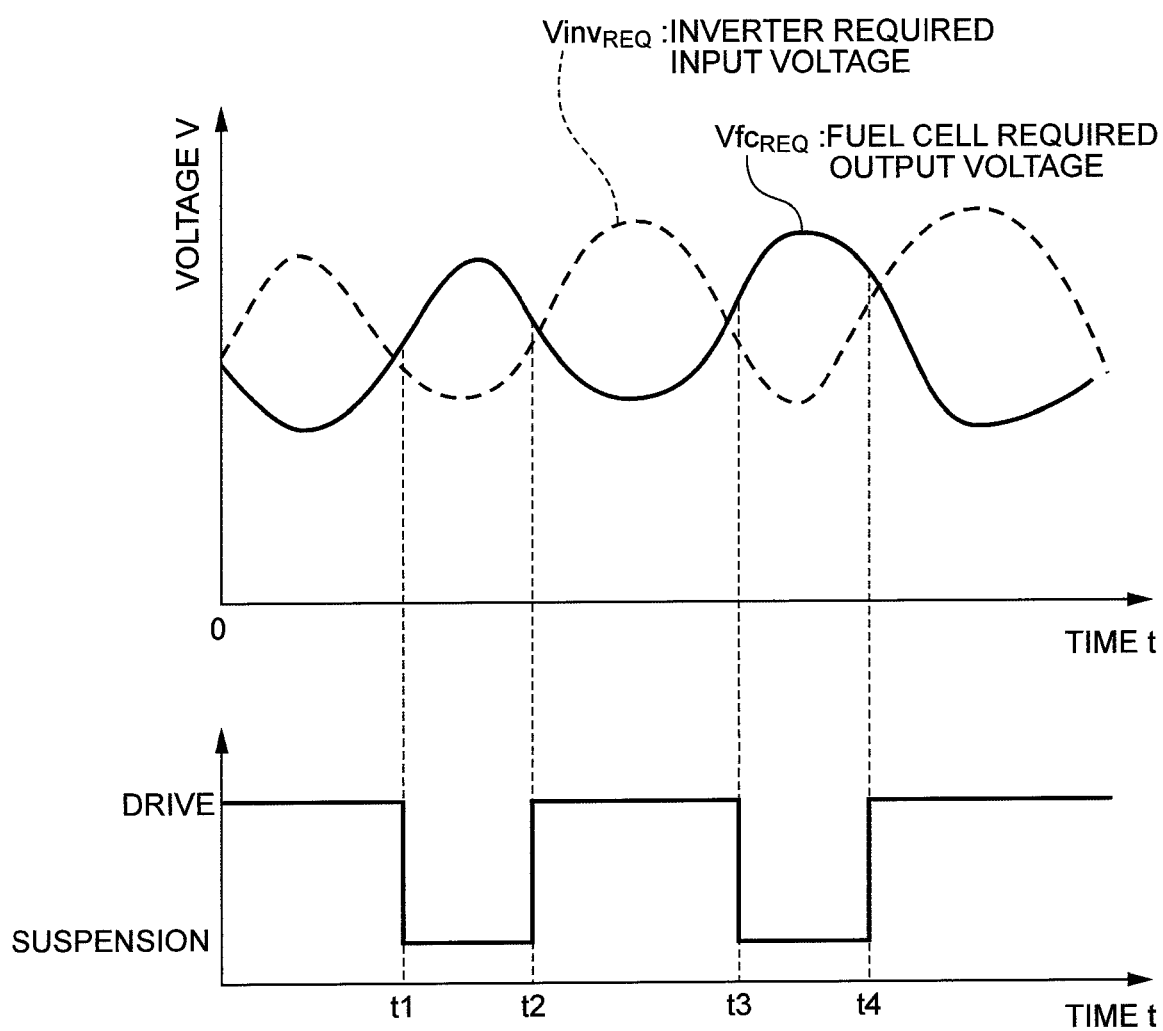
FIG. 8 is an example of a drive control command $C_{Vfc}$ of a first converter 11 in the present first embodiment.

FIG. 8 shows an example of the drive control command $C_{Vfc}$ to the first converter 11 which is changed by the power processing described above. As shown in FIG. 8, when the required output voltage $Vfc_{REQ}$ of the fuel cell 10 is not less than the required input voltage $Vinv_{REQ}$ of the inverter 14, the instruction for the drive is outputted to the first converter 11. On the other hand, when it is judged that the required output voltage $Vfc_{REQ}$ of the fuel cell 10 is lower than the required input voltage $Vinv_{REQ}$ of the inverter 14, the instruction for suspending the drive is outputted to the first converter 11.

By the processing described above, during the continuation of the power processing, to the inverter 14, the higher voltage of the required output voltage $Vfc_{REQ}$ of the fuel cell 10 and the required input voltage $Vinv_{REQ}$ of the inverter 14 is outputted.

(Advantages in Present First Embodiment)

According to the present first embodiment, the following advantages are obtained.

(1) Since the higher voltage of the required output voltage $Vfc_{REQ}$ of the fuel cell 10 and the required input voltage $Vinv_{REQ}$ of the inverter 14 is selected, the output terminal voltage Vfc of the fuel cell 10 is prevented from being higher than the input terminal voltage Vinv of the inverter 14. Therefore, the unnecessary operation of the first converter 11 is avoided and it becomes possible to suppress power consumption related to the converter operation.

(2) When it is judged that the required output voltage $Vfc_{REQ}$ of the fuel cell 10 is not less than the required input voltage $Vinv_{REQ}$ of the inverter 14, the operation of the first converter 11 is suspended, and hence it is possible to prevent the unnecessary power conversion operation.

(3) When the instruction for the operation suspension is issued, the first converter 11 maintains the primary side and the secondary side in the electrically directly connected state, and hence it is possible to easily supply the output terminal voltage Vfc of the fuel cell 10 to the input terminal voltage Vinv of the inverter 14 by the command $C_{Vfc}$ for suspending the operation.

(4) When the second converter 12 is brought into the disconnected state while the operation of the first converter 11 is suspended, it is possible to further suppress the power consumption related to the second converter 12.

(Second Embodiment)

The present second embodiment relates to a power control method for the fuel cell system 100 which allows stable power control without the delay of response by adding hysteresis control to the power control of the first embodiment described above.

In the present second embodiment, since the configuration of the fuel cell system 100 is the same as that in the above-described first embodiment described on the basis of FIGS. 1 to 6, the description thereof will be omitted by retaining the same reference numerals.

The individual configurations in the diagram of the functional blocks shown in FIG. 2 are also the same as those in the above-described first embodiment. However, in the comparison means 206 and the converter operation control means 207, the timing for transmitting the drive control command $C_{Vfc}$ for suspending or starting the operation to the first converter 11 is different.

Figure 9:
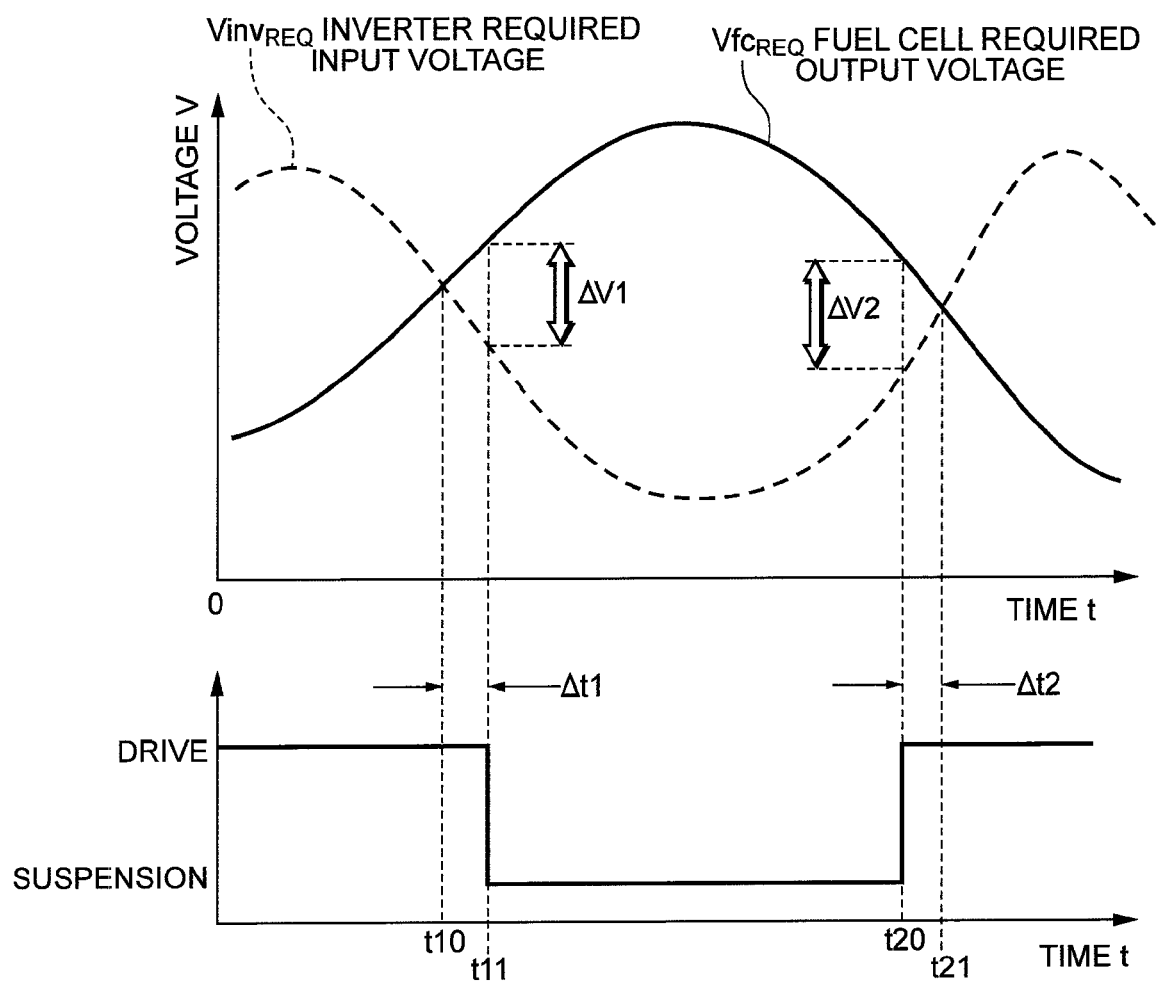
FIG. 9 is a waveform chart for explaining timing for switching the first converter 11 according to a present second embodiment.
Figure 10:
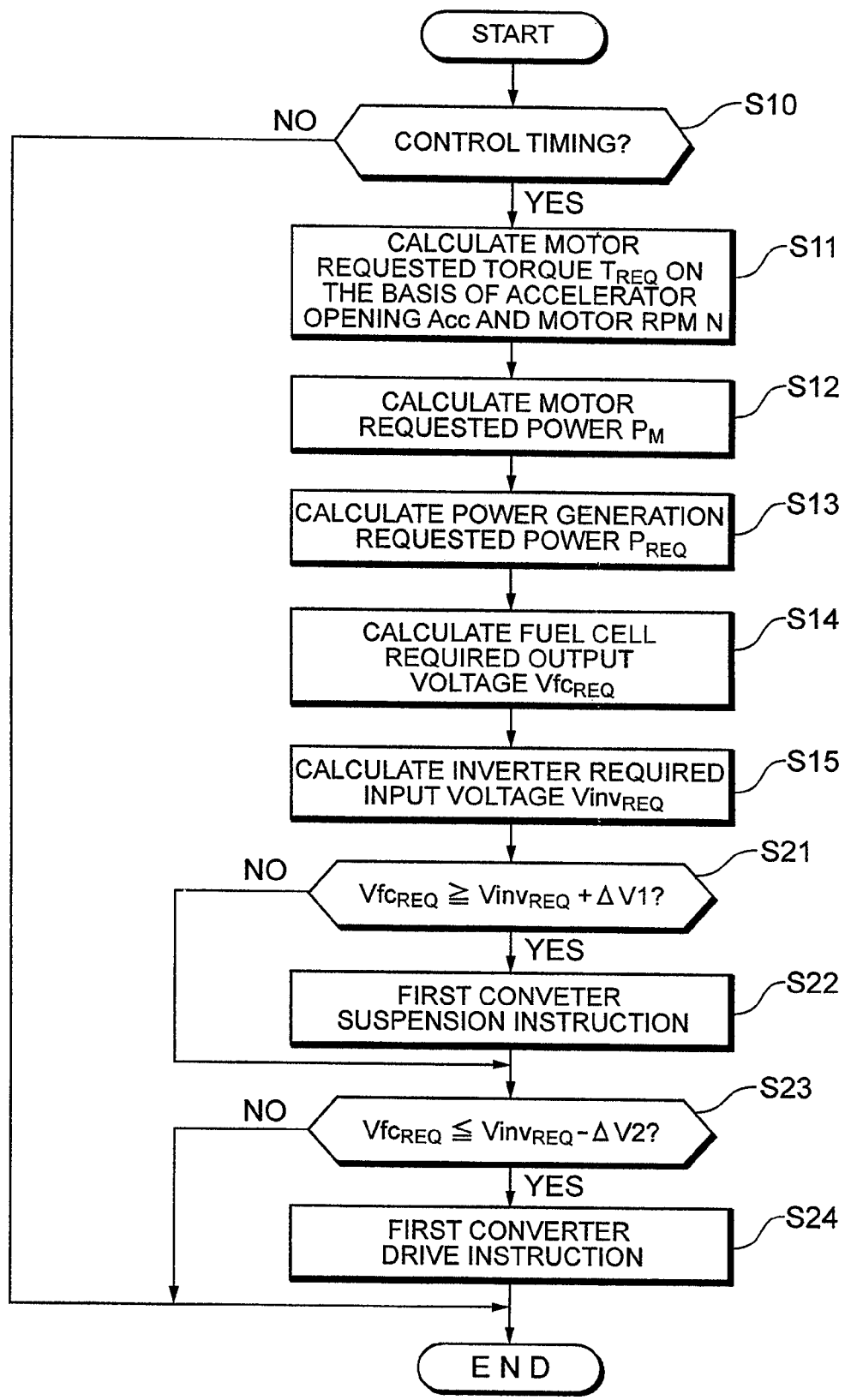
FIG. 10 is a power control flowchart of a fuel cell system according to the present second embodiment.

FIG. 9 shows a waveform chart for explaining timing for switching the first converter 11 according to the present second embodiment. FIG. 9 is a view obtained by enlarging a part of the change over time of each of the fuel cell required output voltage $Vfc_{REQ}$ and the inverter required input voltage $Vinv_{REQ}$ as shown in FIG. 5.

In the above-described first embodiment, when it has been judged that the required output voltage $Vfc_{REQ}$ of the fuel cell 10 is not less than the required input voltage $Vinv_{REQ}$ of the inverter 14, the operation of the first converter 11 has been suspended. In addition, when it has been judged that the required output voltage $Vfc_{REQ}$ of the fuel cell 10 becomes lower than the required input voltage $Vinv_{REQ}$ of the inverter 14, the operation of the first converter 11 has been started.

In contrast to this, in the present second embodiment, even when the required output voltage $Vfc_{REQ}$ of the fuel cell 10 becomes not less than the required input voltage $Vinv_{REQ}$ of the inverter 14, the operation of the first converter 11 is not suspended at this point. The operation of the first converter 11 is suspended only after the difference between the required output voltage $Vfc_{REQ}$ and the required input voltage $Vinv_{REQ}$ becomes not less than a first margin voltage $\Delta V1$ serving as a margin. That is, when Expression (4) is satisfied, the operation of the first converter 11 is suspended.

$$\text{required output voltage } Vfc_{REQ} \geq \text{required input voltage } Vinv_{REQ} + \Delta V1 \quad (4)$$

In addition, in the present second embodiment, the operation of the first converter 11 is started before the required output voltage $Vfc_{REQ}$ of the fuel cell 10 becomes lower than the required input voltage $Vinv_{REQ}$ of the inverter 14. When the required output voltage $Vfc_{REQ}$ approaches the required input voltage $Vinv_{REQ}$, and the difference therebetween becomes not more than a second margin voltage $\Delta V2$ serving as a margin, the resumption of the operation of the first converter 11 is instructed ahead of the case in the first embodiment. That is, when Expression (5) is satisfied, the operation of the first converter 11 is started.

$$\text{required output voltage } Vfc_{REQ} \geq \text{required input voltage } Vinv_{REQ} - \Delta V2 \quad (5)$$

Next, with reference to the flowchart of FIG. 6, a description will be given of power control processing of the fuel cell system 100 of the present second embodiment.

Since Steps 810 to S15 are the same as those in the above-described first embodiment, the description thereof will be omitted.

In Step S21, the comparison means 206 judges whether or not the determined required output voltage $Vfc_{REQ}$ of the fuel cell 10 is not less than the total voltage of the required input voltage $Vinv_{REQ}$ of the inverter 14 and the first margin voltage $\Delta V1$ by comparing them. As the result, when it is judged that the required output voltage $Vfc_{REQ}$ is not less than the voltage given by the required input voltage $Vinv_{REQ}$+the first margin voltage $\Delta V1$ (YES), the power control processing moves to Step S22. In Step S22, the converter operation control means 207 outputs the command $C_{Vfc}$ for suspending the operation of the first converter 11 to the first converter 11. The first converter 11 having received the command $C_{Vfc}$ for suspending the operation suspends the voltage conversion operation, and electrically directly connects the primary side and the secondary side. By this operation, the output terminal voltage Vfc of the fuel cell 10 is supplied as the input terminal voltage Vinv of the inverter 14. When it is judged that the required output voltage $Vfc_{REQ}$ is less than the voltage given by the required input voltage $Vinv_{REQ}$ +the first margin voltage $\Delta V1$ (NO), the power control processing moves to Step S23.

Then, in Step S23, the comparison means 206 judges whether or not the determined required output voltage $Vfc_{REQ}$ of the fuel cell 10 falls within the range of the second margin voltage $\Delta V2$ from the required input voltage $Vinv_{REQ}$ of the inverter 14 by comparing them. As the result, when it is judged that the required output voltage $Vfc_{REQ}$ is not more than the voltage given by the required input voltage $Vinv_{REQ}$-the second margin voltage $\Delta V2$ (YES), the power control processing moves to Step S24. In Step S24, the converter operation control means 207 outputs the command $C_{Vfc}$ for suspending the operation of the first converter 11 to the first converter 11. The converter operation control means 207 outputs the command $C_{Vfc}$ for continuing the operation of the first converter 11 to the first converter 11. Upon reception of the command, the first converter 11 continues the operation for increasing the output terminal voltage Vfc of the fuel cell 10 up to the level of the input terminal voltage Vinv supplied to the inverter 14 by the second converter 12. When it is judged that the required output voltage $Vfc_{REQ}$ is not within the range of not more than the voltage given by the required input voltage $Vinv_{REQ}$-the second margin voltage $\Delta V2$ (NO), the power control processing is ended.

By the processing described above, during the continuation of the power processing, when the required output voltage $Vfc_{REQ}$ of the fuel cell 10 exceeds the required input voltage $Vinv_{REQ}$ of the inverter 14 by the first margin voltage $\Delta V1$, the inverter 14 is suspended. Therefore, as shown in FIG. 9, at time t11 which is behind time t10 when the required output voltage $Vfc_{REQ}$ becomes equal to the required input voltage $Vinv_{REQ}$ by time $\Delta t1$, the operation of the first converter 11 is suspended. In addition, after the operation of the first converter 11 is temporarily suspended, when the required output voltage $Vfc_{REQ}$ of the fuel cell 10 falls within the range of the second margin voltage $\Delta V2$ from the required input voltage $Vinv_{REQ}$ of the inverter 14, the operation of the inverter 14 is resumed. Therefore, as shown in FIG. 9, at time t20 which is ahead of time t21 when the required output voltage $Vfc_{REQ}$ becomes equal to the required input voltage $Vinv_{REQ}$ again by time $\Delta t2$, the operation of the first converter 11 is started.

As described above, according to the present second embodiment, after the required output voltage $Vfc_{REQ}$ of the fuel cell 10 becomes not less than the required input voltage $Vinv_{REQ}$ of the inverter 14, the slight time $\Delta t1$ is spent on waiting. Consequently, it is possible to suspend the first converter 11 after the input terminal voltage Vinv of the inverter 14 reliably becomes higher than the output terminal voltage Vfc of the fuel cell 10. Therefore, it is possible to reliably suppress unnecessary power consumption.

In addition, according to the present second embodiment, the operation of the first inverter 11 is started the slight time $\Delta t2$ before the required output voltage $Vfc_{REQ}$ of the fuel cell 10 becomes lower than the required input voltage $Vinv_{REQ}$ of the inverter 14. Therefore, it is possible to start the power conversion of the fuel cell 10 without the delay of response to thereby prevent the shortage of power supplied to the motor 15.

(Modification)

The present invention is not limited to the above-described embodiments, and can be appropriately modified and applied within the scope of the gist of the present invention.

For example, in each of the above-described embodiments, although the present invention has been applied to the fuel cell system 100 having the first converter 11, the second converter 12, and the inverter 14, the present invention is not limited to such configuration. The present invention can also be applied to a fuel cell system having one DC-DC converter, or having three or more DC-DC converters.

Further, the present invention can also be applied to a fuel cell system in which the motor 15 can be driven by direct current and the inverter 14 is not required. In such fuel cell system, instead of the input terminal voltage Vinv of the inverter 14, the drive voltage Vd of the motor 15 may be set as the control target voltage of the second inverter 12.

Furthermore, the load device is not necessarily the motor. As long as the load device has the input voltage-power consumption characteristic which intersects the fuel cell P-V characteristic as shown in FIG. 4, the invention of the present application is applicable.

Moreover, in the above-described embodiments, although the accelerator (a gas pedal) opening Acc has been inputted as the output request, the present invention is not limited thereto. For example, in a mounting type fuel cell system, there are cases where operation means corresponding to the accelerator does not exist. Such system may be configured such that information on the output request other than the accelerator is used.

INDUSTRIAL APPLICABILITY

The fuel cell system and the control method therefor of the present invention can be mounted on and applied to not only vehicles but also other movable objects. The fuel system and the control method therefor can be applied to a train, a vessel, an aircraft, and a submarine as such movable objects. In addition, the fuel cell system and the control method therefor can be applied to not only the movable objects such as the vehicle and the like but also a stationary power source system and a mobile power source system.

REFERENCE SIGNS LIST

10 . . . fuel cell, 11 . . . first converter, 12 . . . second converter, 13 . . . battery, 14 . . . inverter, 15 . . . motor, 16 . . . differential, 17 . . . tire, 18 . . . auxiliary equipment inverter, 19 . . . high-voltage auxiliary equipment, 20 . . . control device, 21 . . . accelerator opening sensor, 22 . . . sensor group, 23 . . . RPM sensor, 100 . . . fuel cell system, 201 . . . motor requested torque calculation means, 202 . . . motor requested power calculation means, 203 . . . power generation requested power calculation means, 204 . . . fuel cell required output voltage calculation means, 205 . . . inverter required input voltage calculation means, 206 . . . comparison means, 207 . . . converter operation control means, Acc . . . accelerator opening, N . . . motor RPM, $P_{AUX}$ . . . high-voltage auxiliary equipment power, $P_{REQ}$ . . . power generation requested power, $P_M$ . . . motor requested power, $S_{ACC}$ . . . accelerator opening signal, $S_N$ . . . RPM signal, $S_{vd}$ . . . drive voltage signal, $T_{REQ}$ . . . motor requested torque, $V_{BAT}$ . . . battery output terminal voltage, Vd . . . drive voltage (output voltage of inverter 14), Vd2 . . . drive voltage (output voltage of inverter 18), Vfc . . . output terminal voltage of fuel cell 10, Vinv . . . input terminal voltage of inverter 14, $Vfc_{REQ}$ . . . fuel cell required output voltage, $Vinv_{REQ}$ . . . inverter required input voltage, CVfc . . . drive control command for first converter 11, CVinv . . . drive control command for second converter 12, $\Delta V1$ . . . first margin voltage, $\Delta V2$ . . . second margin voltage

We claim:

1. A fuel cell system comprising:
   an inverter which is connected to a load device;
   a first converter which is connected between a fuel cell and the inverter and sets an output voltage of the fuel cell;
   a second converter which is connected between a power storage device and the inverter and sets an input voltage of the inverter; and
   a control device which controls the first converter and the second converter,
   the control device comparing a required output voltage of the fuel cell and an added voltage by adding a first margin voltage to a required input voltage of the inverter, and causing an operation of the first converter to be suspended when judgment is made that the required output voltage of the fuel cell is not less than the added voltage, and
   the first converter maintaining the fuel cell and the inverter in an electrically connected state while the operation of the first converter is suspended.

2. The fuel cell system according to claim 1, wherein, when judgment is made that the required output voltage of the fuel cell is lower than a voltage obtained by adding a second margin voltage to the required input voltage of the inverter, the operation of the first converter is started.

3. A fuel cell system having an inverter which is connected to a load device, a first converter which is connected between a fuel cell and the inverter and sets an output voltage of the fuel cell, and a second converter which is connected between a power storage device and the inverter and sets an input voltage of the inverter,
   the fuel cell system comprising:
   a fuel cell required output voltage calculation device that calculates a required output voltage of the fuel cell;
   an inverter required input voltage calculation device that calculates a required input voltage of the inverter;
   a comparison device that compares the required output voltage of the fuel cell and the required input voltage of the inverter; and
   a converter operation control device that causes an operation of the first converter to be suspended when judgment is made that the required output voltage of the fuel cell is not less than the added voltage,
   the first converter maintaining the fuel cell and the inverter in an electrically connected state while the operation of the first converter is suspended.

4. The fuel cell system according to claim 3, wherein, when judgment is made that the required output voltage of the fuel cell is lower than a voltage obtained by adding a second margin voltage to the required input voltage of the inverter, the operation of the first converter is started.

5. A power control method for a fuel cell system having an inverter which is connected to a load device, a first converter which is connected between a fuel cell and the inverter and sets an output voltage of the fuel cell, and a second converter which is connected between a power storage device and the inverter and sets an input voltage of the inverter,
   the method comprising:
   calculating a required output voltage of the fuel cell;
   calculating a required input voltage of the inverter;
   comparing the required output voltage of the fuel cell and an added voltage by adding a first margin voltage to the required input voltage of the inverter;
   causing an operation of the first converter to be suspended when judgment is made that the required output voltage of the fuel cell is not less than the added voltage; and
   maintaining the fuel cell and the inverter in an electrically connected state while the operation is suspended in the fuel converter.

* * * * *